W. DAME.
Self-Lubricating Pulleys.
No. 147,910. Patented Feb. 24, 1874.
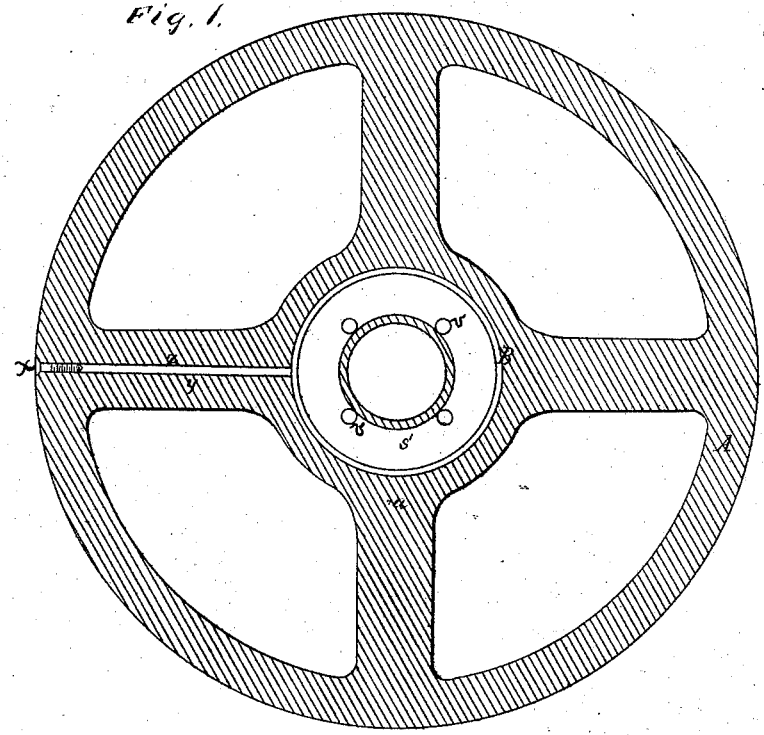
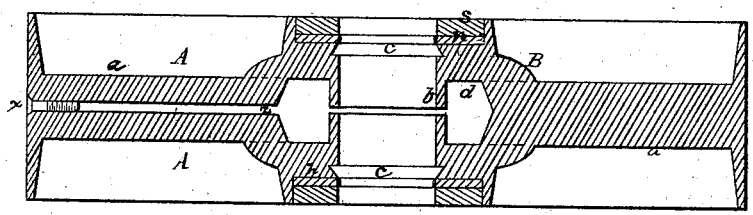
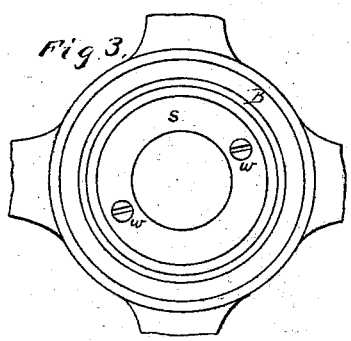
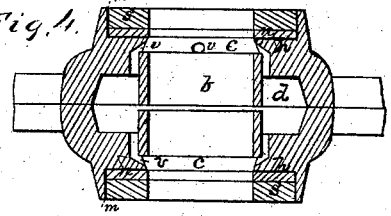
Witnesses.
F. E. Upham.
Chas. B. Steele
Inventor.
William Dame
Chipman Hosmer & Co
Attorneys

UNITED STATES PATENT OFFICE.

WILLIAM DAME, OF WOONSOCKET, RHODE ISLAND.

IMPROVEMENT IN SELF-LUBRICATING PULLEYS.

Specification forming part of Letters Patent No. 147,910, dated February 24, 1874; application filed May 10, 1873.

*To all whom it may concern:*

Be it known that I, WILLIAM DAME, of Woonsocket, in the county of Providence and State of Rhode Island, have invented a new and valuable Improvement in Self-Lubricating Pulleys; and I do hereby declare that the following is a full, clear, and exact description of the construction and operation of the same, reference being had to the annexed drawings making a part of this specification, and to the letters and figures of reference marked thereon.

Figure 1 of the drawings is a representation of my improved pulley by a central section. Fig. 2 is a cross-section of the same. Fig. 3 is a detailed view of the hub. Fig. 4 is a section of the hub.

This invention has relation to self-lubricating pulleys; and it consists in the construction and novel arrangement of the removable and adjustable packing-caps in contact with the packing-rings in the annular end recesses of the hub. The object of this invention is to provide a self-lubricating pulley which will keep its journal clean outside of the bearing, and which will by the same means economise the oil of the reservoir, thereby saving labor and oil.

In the accompanying drawings, the letter A designates the pulley, having an enlarged hub, B, and an internal groove, $d$, annularly arranged around the bearing-surface $b$ of the hub, to serve as the oil-reservoir. A feed-channel, $z$, is made through one of the spokes $a$ for the introduction of the oil into the reservoir, said channel being closed, when not in use, by a screw-plug, $x$, the head of which is provided with a counter-sunk seat, so that its surface will be flush with the belt-surface of the pulley. At the ends of the bearing $b$ are located the annular oil-grooves $c$, which communicate by means of perforations $v$, having a bent or elbow shape, as indicated in Fig. 4 of the drawings, with the oil-reservoir $d$, said perforations preferably running from the innermost part of said oil-reservoir, so that the centrifugal force of the revolving pulley will prevent the oil from being fed too fast to the bearing. In the ends of the hub, at each end of the bearing $b$, are arranged the annular packing-recesses $m$, shoulders $h$ being formed for the packing-bearing just beyond the grooves $c$ of the journal-bearing $b$. The packing-rings of leather or other suitable material are indicated by the letter $n$. The annular packing-caps $s$ are placed in the recesses $m$ on the outside of each packing, and are designed to be secured to the hub by means of screws $w$. If the packing used is sufficiently compressible, the screws may be tightened as it wears on the inside edge, thus preserving a tight joint, and preventing the oil from wasting at the ends of the journal-bearing.

What I claim as my invention, and desire to secure by Letters Patent, is—

1. A self-lubricating hub, packed by washers $n$ of leather or other suitable material, and clamp-plates $s$ inserted into recesses at both ends of the said hub and fastened thereto by set-screws $w$, substantially as and for the purpose mentioned.

2. In a self-lubricating wheel, the combination of the annular oil-reservoir $d$, bearing $b$, perforations $v$, oiling-grooves $c$, and washers $n$, with the plates $s$ and set-screws $w$, substantially as and for the purpose set forth.

In testimony that I claim the above I have hereunto subscribed my name in the presence of two witnesses.

WILLIAM DAME.

Witnesses:
 HENRY HOLBROKE ROBINSON,
 CHRISTOPHER ROBINSON.